United States Patent [19]

Hoffman et al.

[11] 4,189,946

[45] Feb. 26, 1980

[54] THREE AXIS GYRO

[75] Inventors: Jay Hoffman, Livingston; Lincoln S. Ferriss, Lincoln Park, both of N.J.

[73] Assignee: The Singer Company, Little Falls, N.J.

[21] Appl. No.: 851,942

[22] Filed: Nov. 16, 1977

[51] Int. Cl.² .................. G01C 19/28; G01C 19/30
[52] U.S. Cl. .................................. 74/5.4; 74/5.6 R
[58] Field of Search .............. 74/5.4, 5.41, 5.6 R, 74/5.6 D; 73/505

[56] References Cited

U.S. PATENT DOCUMENTS

| | | | |
|---|---|---|---|
| 3,276,273 | 10/1966 | Baker | 74/5.4 X |
| 3,362,229 | 1/1968 | Trueblood | 73/505 |
| 4,074,580 | 2/1978 | Boltinghouse et al. | 74/5.41 X |

Primary Examiner—Rodney H. Bonck
Attorney, Agent, or Firm—T. W. Kennedy

[57] ABSTRACT

In a gyroscope including a rotor spinning about a spin axis, the rotor gimballed about two mutually perpendicular axes and including cross coupled closed loops operative on the two mutually perpendicular axes so as to be able to detect rates about said two axes, a feedback loop is provided to cause the gyroscope spin axis to nutate in a cone about its nominal, blind, spin axis at a controlled amplitude and at a frequency which is at least close to the natural nutation frequency of the gyro and the nutation detected and changes in the nutation amplitude or frequency used as a measure of the rate about the blind axis.

11 Claims, 11 Drawing Figures

$f_4 = f_2 \cdot \overline{f_3} + \overline{f_2} \cdot f_3$

THREE AXIS GYRO

BACKGROUND OF THE INVENTION

This invention relates to gyroscopes in general and more particularly to an improved gyroscope which permits sensing angular rate simultaneously about three mutually perpendicular axes through the use of one rate gyro.

Gyroscopes find wide use in navigation and guidance systems. Particularly when used in tactical missiles, homing projectiles and the like, low cost and low weight is desired. At the present time, a minimum of two gyros is required in order to effect measurements in three mutually perpendicular axes. This results from the fact that typically a gyro will have a spin axis about which its rotor spins and will be gimbaled in a pair of gimbals. Sensing of rates about the two gimbal axes is possible but sensing of a rate along the spin axis is not. To obtain sensing about the spin axis of the one gyro, another gyro oriented at 90° thereto is required. Naturally, the requirement to provide two separate gyros adds to the cost and weight. In the case of guidance systems for tactical missles and homing projectiles and other like devices where the gyro will be destroyed upon use of the projectile this undesirably adds to the cost and weight.

Thus, the need for a system which permits sensing angular rates simultaneously along three mutually perpendicular axes using a single rate gyro becomes evident.

SUMMARY OF THE INVENTION

The present invention provides such a system. In essence, a conventional two axis rate gyro is caused to go into a sustained nutation at a fixed and controlled amplitude about its spin axis. The cyclically precessing gyro rotor, due its systematical dynamic changes, becomes dynamically inter-active with a rate vector applied to its nominally "blind axis", i.e., its spin axis, and therefore develops a measurable response to this in its output, i.e. in the measurable torque delivered to the rotor to cause its nutation.

DETAILED DESCRIPTION OF THE PREFERRED EMBODIMENT

Figure 1:
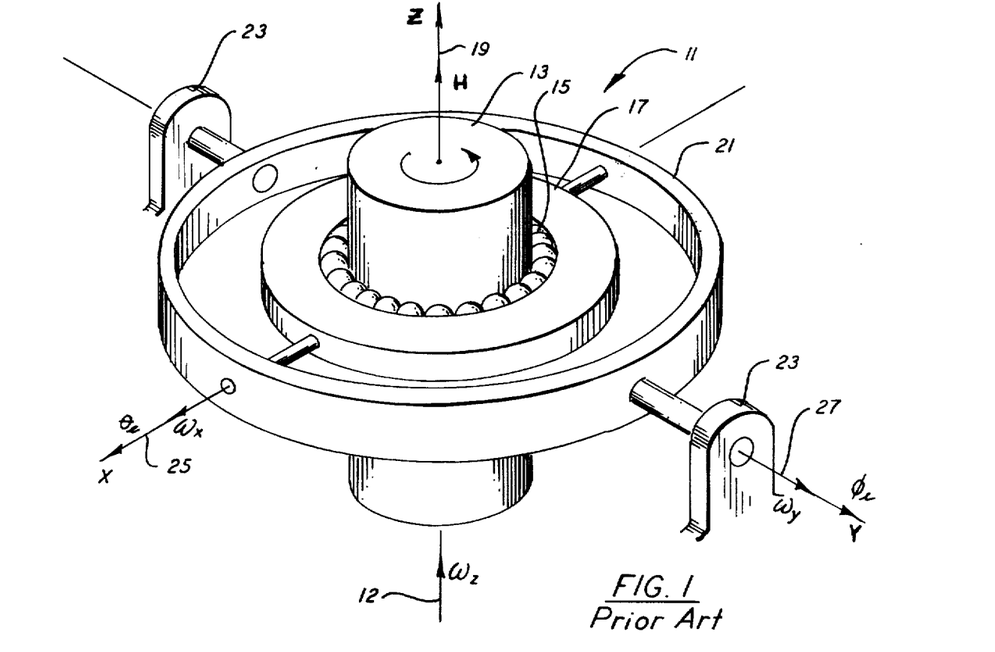
FIG. 1 is a perspective view of a typical prior art gyroscope with which the present invention may be used.

FIG. 1 illustrates, in schematic, a perspective view of a conventional two axis gyro 11. The gyro includes a rotor 13 which is supported in bearings 15 within a ring 17 and is driven in conventional fashion at a high rate of speed rotating about Z axis 19. The ring 17 is gimbaled to a ring 21 which itself is gimbaled to base member 23. The ring 17 is gimbaled to the ring 21 along an X axis 25 and the ring 21 gimbaled to the base along a Y axis 27. The gyro rotor 13 rotates at a high angular rate. Rotation about the X axis is designated $\omega_x$ and rotational position about the Y axis $\omega_y$.

Figure 2:
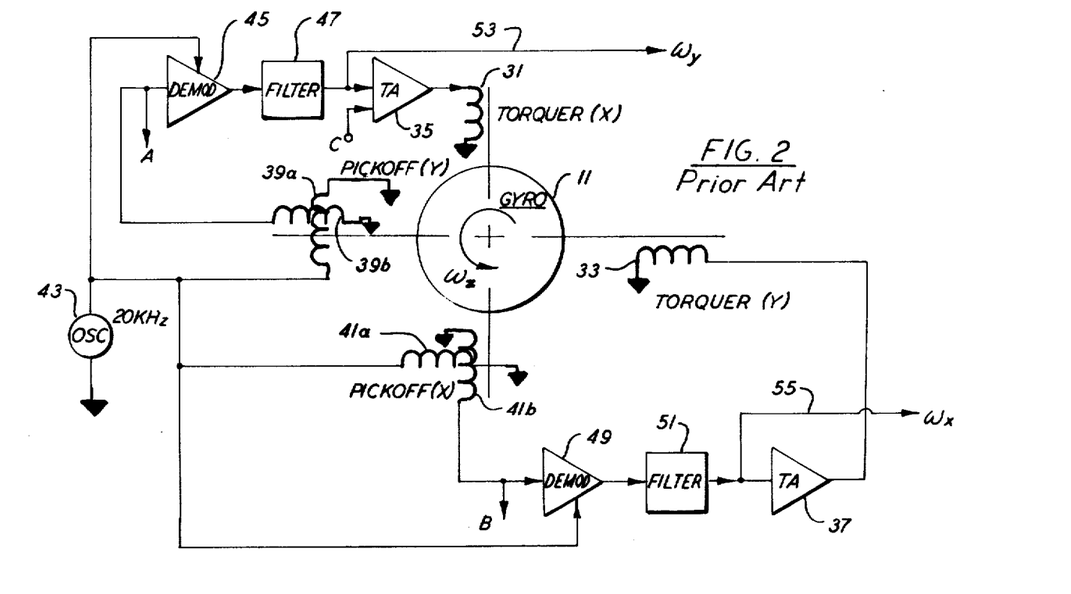
FIG. 2 is a circuit diagram of the conventional low frequency pass capture loops of the gyroscope of FIG. 1.

FIG. 2 illustrates the mechanization of the gyro of FIG. 1. Illustrated schematically is the gyro 11 rotating at the angular rate of $\omega_z$. Associated with the gyro is a torquer coil 31 for torquing about the X axis and a torquer coil 33 for torquing about the Y axis. Torquer coil 31 is fed by a torquer amplifier 35 and torquer coil 33 by a similar torquer amplifier 37. Also, associated with the gyro are excitation and pickoff coils 39a and 39b respectively for the Y axis and 41a and 41b are excited by a generator 43 at a frequency of, for example, 20 KHz. These coils cooperate with magnetic members on the gyro so that any rotational angle about X or Y axis will be sensed by the coils 39b and 41b. The output of the Y pickup or sensing coil 39b is an input to a demodulator 45 which obtains a reference input from the generator 43. Its output is coupled through a lowpass filter 47 to the torquer amplifier 35. Similarly, the output of the X pickup coil 41b is provided as an input to a demodulator 49 also obtaining a reference from the generator 43. The output of demodulator 49 is coupled through another lowpass filter 51 to the torquer amplifier 37. A quantity proportional to the angular rate $\omega_y$ is provided on the line 53 from the input to the torquer amplifier 35. Similarly a quantity proportional to the angular rate $\omega_x$ is taken off on line 55 from the input to the torquer amplifier 37. Thus, in conventional fashion a sensed rotation about the Y axis is coupled to the X torquer which will cause the gyro to precess back into the proper position. Similarly, a rotation about the X axis is coupled to the Y torquer to bring the gyro into alignment about the X axis.

Figure 3:
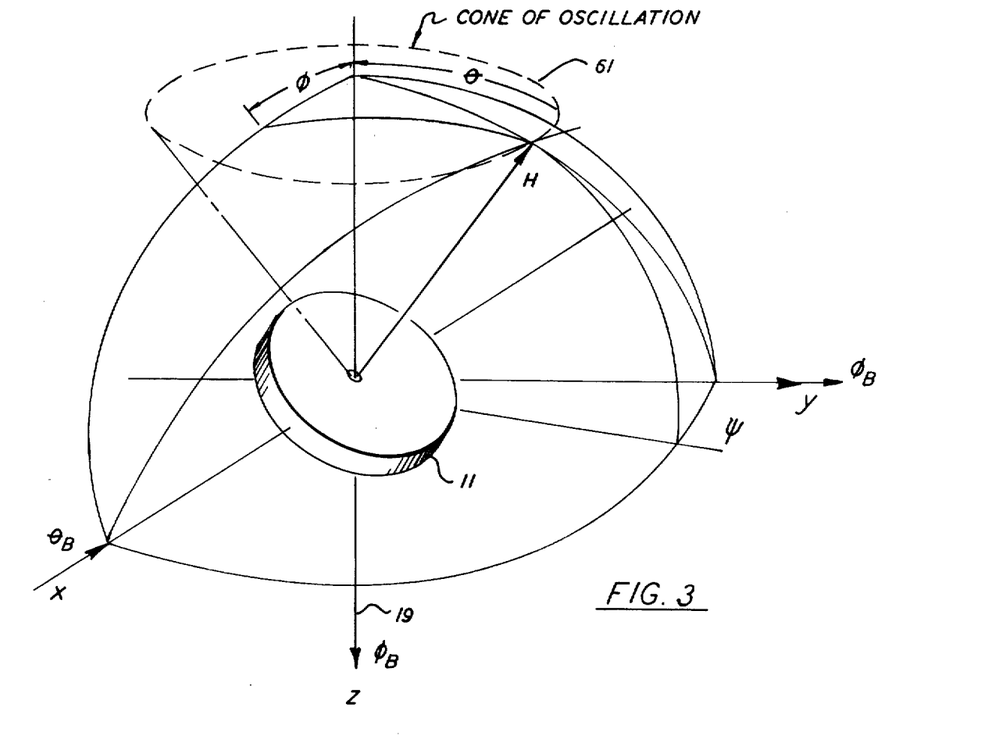
FIG. 3 is a perspective presentation illustrating the nutation which is obtained with the present invention.

In order to produce the dynamic interaction required in accordance with the present invention, it is necessary to impose specific constraints upon the gyro permitting the blind axis, i.e. the axis 12 of FIG. 1 to couple to the momentum vector. In a perfectly free gyro such coupling will not exist since the blind axis rate will be "gimbaled out". FIG. 3 illustrates what is desired in the present invention. Rather than the Z axis 19 remaining fixed as it is in the conventional gyro of FIG. 1 it is desired that this axis travel in a cone of oscillation 61. Preferably, as will become more evident below, this is done at a frequency near the natural nutation frequency of the gyro. Typically this is about twice rotor speed, possibly at 300 Hz, well above the dynamic response of the lowpass filters 47 and 51 of FIG. 2.

Figures 4, 4A:
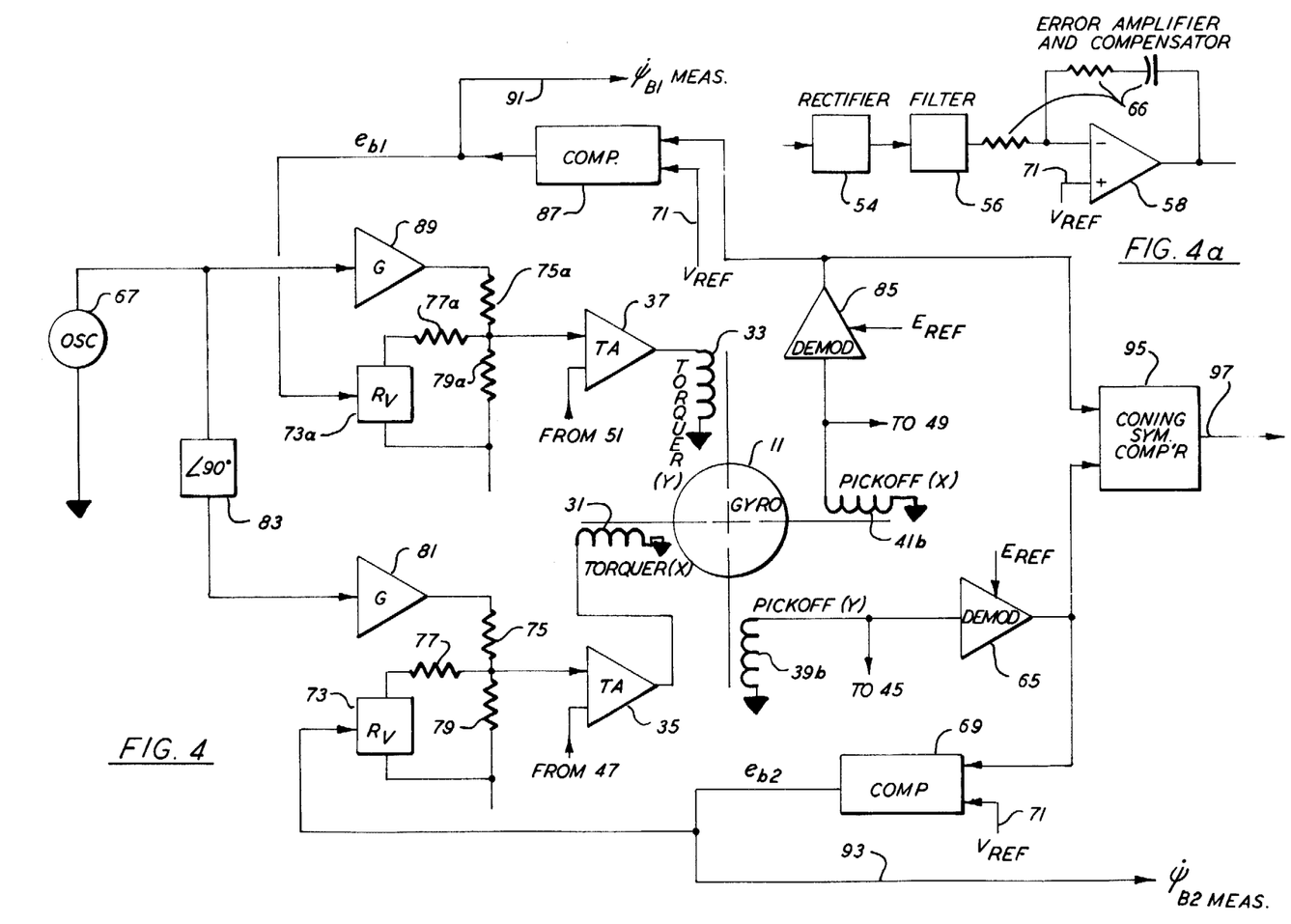
FIG. 4 is a schematic diagram of a first embodiment of the present invention.

In order to obtain the necessary nutation, in accordance with a first embodiment of the present invention a second set of gyro loops is superimposed on the gyro loops shown on FIG. 2. This is illustrated by the diagram of FIG. 4. Repeated on FIG. 4 is the gyro 11, the torquer coils 33 and 31, the pickup coils 39b and 41b and the torquer amplifiers 37 and 35. The remaining portions of the loops of FIG. 2 are interconnected in the manner illustrated on FIG. 2 although not shown again on FIG. 4. As illustrated, the output from the Y pickoff coil 39b is coupled into a demodulator 65 obtaining a reference input from a generator 67 operating at a frequency close to the nutation frequency of the gyro, i.e. at about 300 Hz. The pickoff signal, assuming nutation is taking place, will modulate its 20 Khz carrier at the nutation frequency; the 20 KHz carrier being derived from the generator shown on FIG. 2. Since its reference input is at the nutation frequency demodulator 65 will respond only to the signal at this frequency. The output from the demodulator 65 is one input to a comparator 69 where it is compared with a reference input on line 71 defining the desired amplitude of nutation. The output of the comparator is provided as a control input to a controllable resistor 73, for example, a field effect controllable resistor. This resistor forms a portion of a resistor divider which include resistors 75, 77 and 79, resistor 79 being coupled between the input of the torque amplifier 35 and ground, resistor 77 and controllable resistor 73 being coupled in parallel therewith and resistor 75 being coupled between the output of an amplifier 81 and the input to the torque amplifier. The input to the amplifier 81 is obtained from a 90° phase shifter 83 which has its input coupled to the generator 67. In similar fashion, the output from the X pickoff coil 41b is coupled through a demodulator 85 and comparator 87, the output of which controls another resistor 73a associated with resistors 77a, 75a and 79a at the input to the torque amplifier 37. These resistors are arranged in the same manner as were the resistors 73, 75 77 and 79. The resistor 75a is coupled to another amplifier 89 which obtains its input from the generator 67. Since the input to the amplifier 89 is in phase with the generator and the input to the amplifier 81 is 90° out of phase, a nutation which will cause rotation in a cone as shown on FIG. 3 will result. The output of either comparator 69 or comparator 87 is a measure of the rate along the blind axis.

Each comparator 69 or 87 will include a rectifier, filter error amplifier and compensator as shown in FIG. 4a. As illustrated, the output from demodulator 85 or 65 is coupled through a rectifier 54 and ripple filter 56 before being provided to the inverting input of an error amplifier 58. The reference voltage on line 71 is fed to the non inverting input of amplifier 58. The output thereof is then compensated by a compensating circuit 66 having the transfer function adjustable to K(s)/S or K(s)/S+a.

As a result, there are now outputs proportional to the rates about all three axis, the rate about the gimbal axes X, Y being supplied from the output lines 53 and 55 of FIG. 2 and an output proportional to the rate about the blind axis on either line 91 or 93 of FIG. 4. Also shown in FIG. 4 are the outputs of the demodulator 65 and 85 coupled as inputs to a coning symmetry comparator 95. This comparator provides an output on line 97 indicating whether or not the cone is symmetrical. If proper control action is being taken, since the reference voltage on line 71 is the same, a perfect cone should result. In such a case, the output of the coning system and comparator should be zero with its two inputs equal. Any deviation will result in an error signal therefrom indicating that improper coning is taking place. This output may be used to indicate a failure which can be corrected or in cases of minor errors, may be used in applying corrections to the outputs on lines 91 and 93. These outputs on lines 91 and 93 along with the outputs on lines 53 and 55 of FIG. 2 are supplied, in conventional fashion, to the navigation system with which the gyro is used for processing therein. In that system, the output on line 97 can be used to correct the output on lines 91 and 93.

In the embodiment just described, a mechanization for measuring the blind axis rate which is based upon exploitation of the impending amplitude change induced upon the nutating gyro by its dynamic interaction with blind axis inputs was described.

Figure 5:
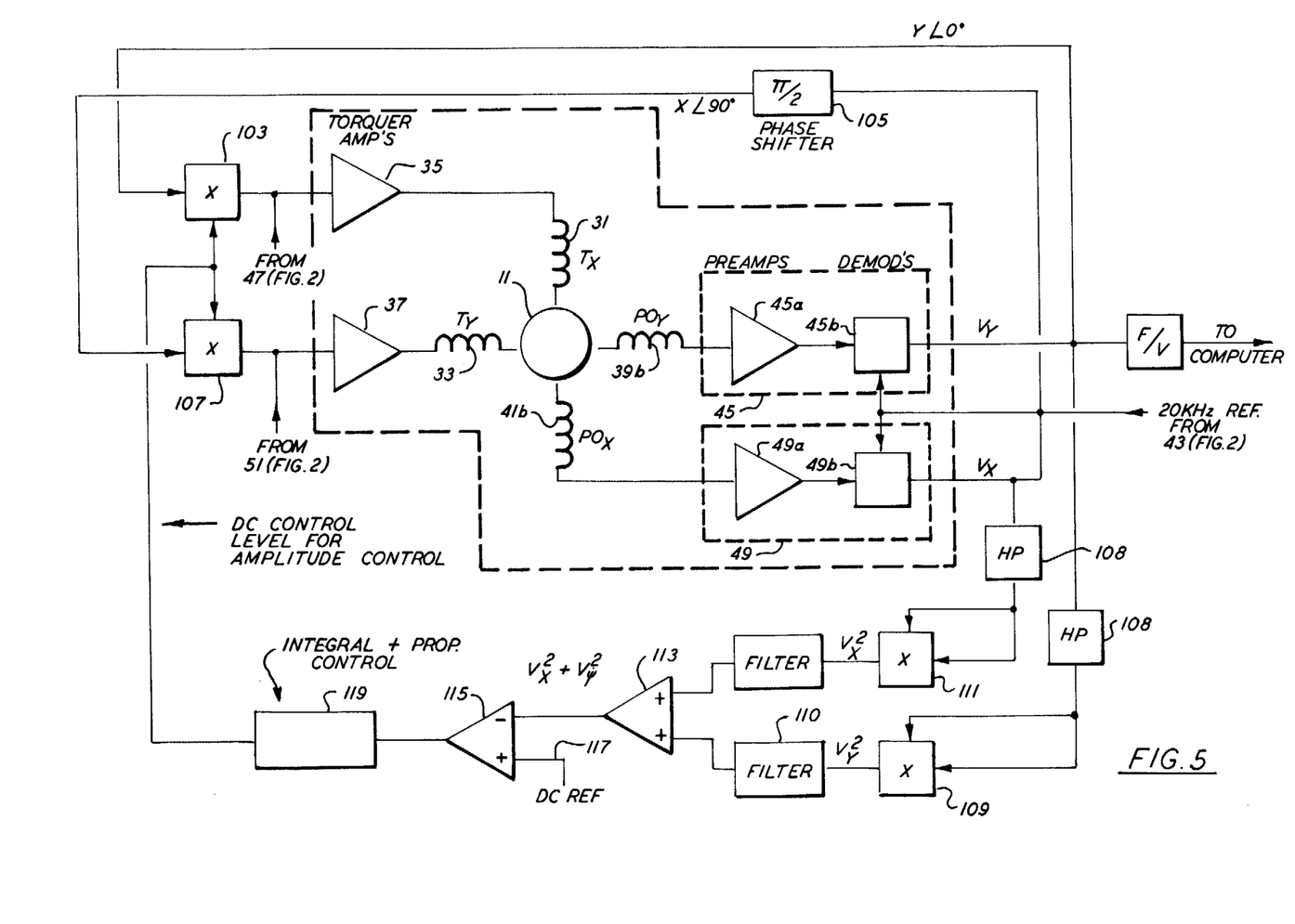
FIG. 5 is a schematic diagram of a second implementation of the present invention.

While the stability of this measurement is considered good for many applications [7°/Hr] the embodiment of FIG. 5 can be employed to obtain more accuracy. This embodiment exploits the phase angle change in the nutating gyros's output induced by the dynamic interaction with the blind axis rate. The disclosed system is a closed loop oscillating system which permits the gyro to oscillate near its natural nutation frequency without the use of an external oscillator. Shown in FIG. 5 is the gyro 11, torquer coils 31 and 33, pick up coils 41b and 39b and torquer amplifiers 35 and 37. Also included are demodulators 45 and 49. As illustrated, each demodulator includes a preamplifier and a demodulator designated respectively as 45a and 45b and 49a and 49b. The connection to the remaining elements of FIG. 2 are as indicated on FIG. 2 even though not shown on FIG. 5. The output of the Y demodulator 45b is fed as an input to a multiplier 103. The output of the X demodulator 49b is fed to a 90° phase shifter 105. The output of the 90° phase shifter 105 is an input to a multiplier 107. The multipliers obtain second inputs in a manner to be described below. The output of multiplier 103 is an input to torquer amplifier 35 and the output of multiplier 107 to torquer amplifier 37. The outputs of the demodulators 45b and 49b are provided as respective inputs to multipliers 109 and 111 after being coupled through high pass filters 108. The outputs thereof, which will be the squares of the respective inputs, are filtered through filters 110 added to obtain the sum of the squares, (which will be proportional to the square of the radium of the cone of oscillation of FIG. #3) in amplifier 113. The output of amplifier 113 is an input to a summing amplifier 115 where the difference between the output of amplifier 113 and a dc reference valve on 117 is determined. The dc reference represents the square of the desired amplitude. The output is processed through an integral and proportional control 119 as the second input to multipliers 103 and 107. The conditions for oscillation in the loop are that there be zero phase shift and that the loop gain be unity. The integral and proportional controller, which will simply comprise an operational amplifier with a resistor and capacitor in series in its feedback path, controls the multipliers 103 and 107 to obtain unity gain in the loop. The output voltage of the demodulators 45 and 47 will be at the nutating frequency. Changes of phase due to interactions of the momentum vector with the blind axes will result in a frequency change. This frequency change may be measured using the timing circuits within the computer associated with the system in which the gyros are employed, or by other means such as a frequency-to-voltage converter. The change with respect to the nominal output with no interaction can be detected and is a measure of the blind axis rate.

Figure 6:
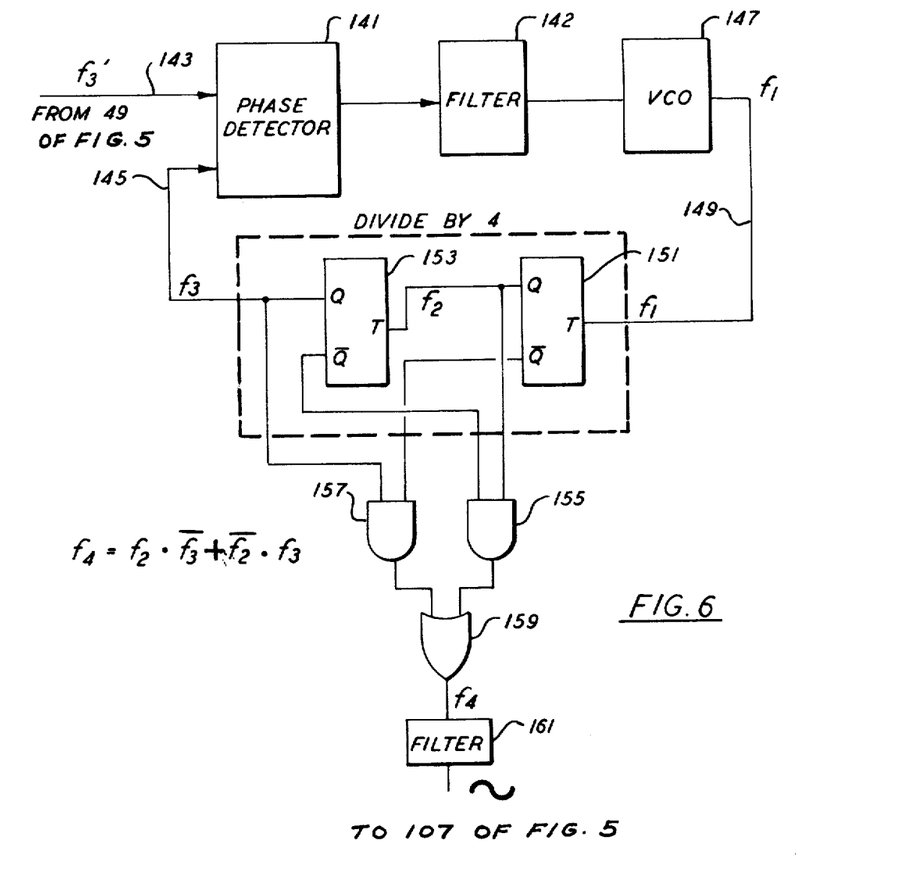
FIG. 6 is a block diagram illustrating the manner in which a phase shifter for use in the implementation of FIG. 5 can be constructed.
Figure 6A:
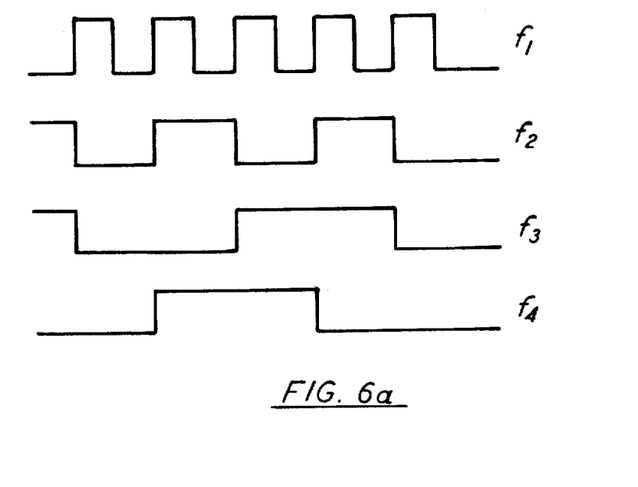
FIG. 6a is a wave-form diagram illustrating the operation of the phase shifter of FIG. 6.

FIG. 6 illustrates the manner in which the phase shifter 105 of FIG. 5 can implemented using a phase locked loop comprising a phase detector 141 having as an input the output of the demodulator 49 of FIG. 5. The output of the phase detector is a voltage proportional to the difference in phase between the input on line 143 and feedback on line 145. This voltage is filtered through a filter 142 and provides the input to a voltage controlled oscillator 143, the output of which is used to provide the feedback. The output of voltage controlled oscillator 147 on line 149 is, in this case, coupled through two flip flops 151 and 153 resulting in a division of the frequency by four. The output of flip flop 153 is fed back on the line 145. As a result, the frequency output of the voltage controlled oscillator, in order to maintain a condition where the phase locked loop has equal frequency, and phase, with the input on line 143, will have an output frequency four times that of the input. The output frequency of the voltage controlled oscillator is designated $f_1$ and its wave form is illustrated in FIG. 6a. After division by two in the flip flop 151 the output thereof, $f_2$, will be as also shown on FIG. 6a. The additional division by two results in the waveform $f_3$ out of the flip flop 153. This is also illustrated. Since it is desired this waveform $f_3$, is the one matched in frequency and phase with input $f_3$. In order to obtain an output shifted 90° with respect to its input, the waveform indicated on FIG. 6a as $f_4$ is required. The conditions for this wave form to be high are that the $f_2$ pulse be present and the $f_3$ not present or that the $f_3$ pulse be present and the $f_2$ pulse not present. Thus, the $\overline{Q}$ output of flip flop 151 is combined with the Q output of flip flop 153 in an AND gate 155 and the Q output of flip flop 151 with the $\overline{Q}$ output of flip flop 153 in an AND gate 157. The outputs of these gates are combined in an OR gate 159. The output of OR gate 159 will be the waveform $f_4$ shown on FIG. 6a. As illustrated, it is shifted in phase 90° from the waveform $f_3$. This waveform may then be filtered in a filter 161 to obtain a sinusoidal shape. The phase locked loop is a commercially available micro circuit such as a type CD4046. For flip flops 153 and 151 and gates 155 and 157 and 159, the CD4000 series of logic made by RCA may be utilized.

The multiplier shown on FIG. 5 may be implemented using a multiplier AD532 manufactured by Analog Devices of Norwood, Mass. Amplifiers 113 and 115 and the amplifier in integral and proportional control 119 may be the 741 type of operation amplifier manufactured by Fairchild Semiconductor and others.

Figure 7:
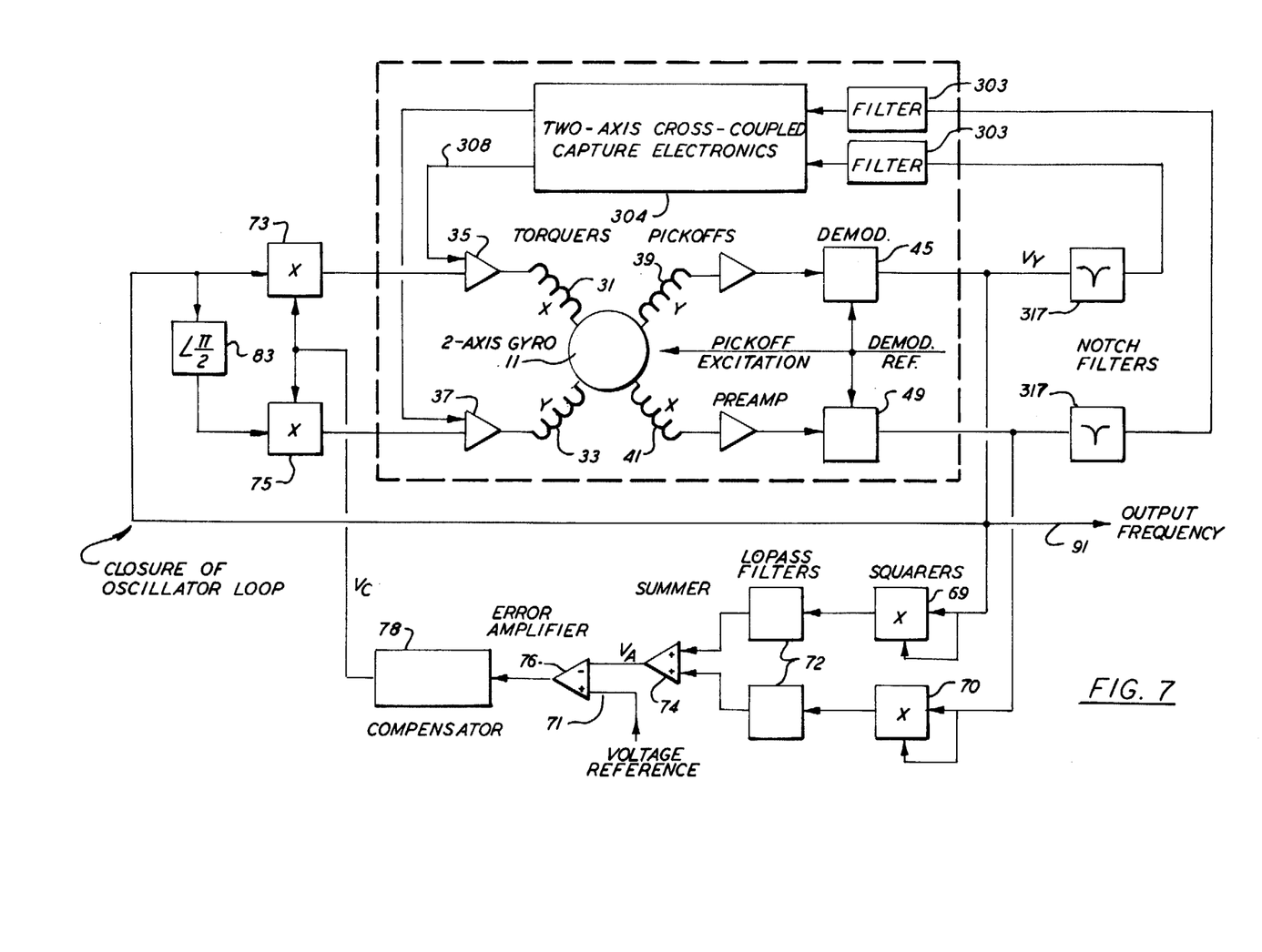
FIG. 7 is a block diagram of a further embodiment of the present invention.

A particularly practical embodiment of the present invention is illustrated by the diagram of FIG. 7. This embodiment is essentially the same as the conceptual embodiment of FIG. 5. Repeated on FIG. 7 is the gyro 11, the torquer coils 33 and 31, the pickup coils 39 and 41 the demodulators 45 and 49 and the torquer amplifiers 37 and 35. As illustrated, the output from the Y pickoff coil 39 is coupled into the demodulator 45. The pickoff signal, assuming nutation is taking place, will contain components at the nutation frequency and at the frequency of 20 KHz from the demodulator reference, i.e. pickoff excitation. Since its reference input is at this frequency demodulator 45 will produce a signal at the frequency of nutation. The output from the demodulator 45 supplies inputs to a multiplier 69 where it is squared. Similarly the output of demodulator 49 is squared in a multiplier 70. After filtering through low pass filters 72, the multiplier outputs are added in a summing amplifier 74. Its output is compared in a comparator 76 with a reference input on line 71 defining the desired amplitude of nutation. The output of the comparator 76 after coupling through compensator 78 is provided as a control inputs to amplitude control devices 73 and 75. Analog multipliers such as the AD532 operate well as amplitude control devices. The other input to multiplier 73 is from the output of demodulator 45. The input to the multiplier 75 is obtained from a 90° phase shifter 83 which has its input coupled to the demodulator 45. The output of multiplier 73 is an additional input to torquer 35 and the output of multiplier 75 an input to torquer 37. Since the input to the multiplier 73 is in phase with the Y feedback signal and the input to the multiplier 75 is 90° out of phase, due to the feedback a nutation at the natural frequency which will cause rotation in a cone as shown on FIG. 3 will result. The output frequency on line 91 is a measure of the rate along the blind axis.

The squarers 69 and 70 and summer 74 produce a voltage $V_A$ proportional to the sum of the squares of the amplitudes of nutation about the X and Y axes of the gyro and thence a voltage proportional to the square of the nutation vector amplitude. the control loop, through the multipliers 73 and 75 maintains a fixed amplitude of nutation as determined by the reference voltage on line 71.

The effect of blind axis input rates is to alter the phase of the torquer-to-pickoff modulation characteristic, but since this characteristic is in a loop-phase-zeroing oscillator* the frequency must change by:

$$f = (f_o \Delta \phi)/2Q \qquad (*)$$

where $f_o$ is nutation frequency, Q is the quality factor of the nutation resonance characteristic and $\Delta\phi$ is the bind-axis-induced phase shift. Thus, the frequency of oscillation is the readout variable indicative of blind-axis input rate. The output of the demodulators 45 and 49 of FIG. 7 are also provided as inputs to notch filters 317. The notch filters are adapted to respond to the nutation frequency, removing such signals from those coupled through filters 303 and into the normal two-axis cross coupled capture electronics 304 which will be of the nature described in connection with FIG. 2. As with FIG. 5, the output is obtained by monitoring frequency changes on line 91 from demodulator 45.

*Barkhausen's criteria for steady-state sinusodial oscillations are that the gain around the oscillator loop be unity and the phase zero.

Figure 8:
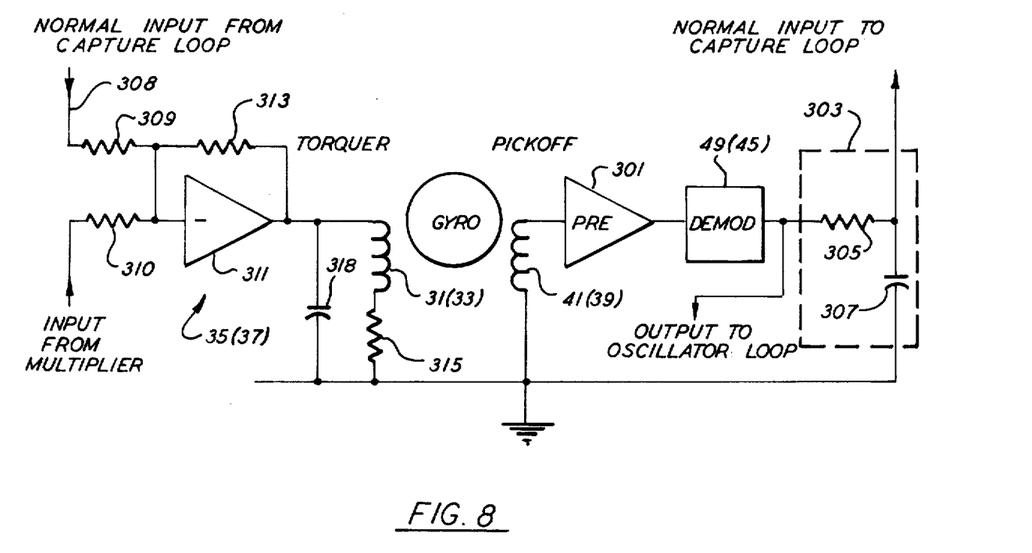
FIG. 8 is a more detailed schematic diagram of a portion of the circuit of FIG. 7.

A portion of this circuit is shown in more detail on FIG. 8. One of the signals, for example, the signals on line 308, to the amplifier 35 or 37 of FIG. 7, is illustrated. As shown on FIG. 8, this normal input from the capture loop is coupled through a resistor 309 into an amplifier 311. The input from the multiplier 73 or 75 is similarly coupled through a resistor 310 into the inverting input of amplifier 311. Amplifier 311 has a feedback resistor 311 in its negative feedback loop. The torquer coil 31 or 33 is shown with its internal resistance normally about 80 ohms shown as a separate resistor 315. A capacitor 318 is placed across the torque coil. The output circuit including the pick-off coil 41 or 39 is also shown in more detail. Shown is the preamplifier 301 and the demodulator 49 or 45. The output of the demodulator is taken directly to the squarer 60 or 70 of FIG. 7. The filter 303 is shown in more detail, the filter including a resistor 305 and capacitor 307. The outputs to the squarers are taken off between the demodulator output and resistor 305, because the filter 303, which serves as the demodulator ripple filter, and thus determines the band width in the capture loop, would introduce an unacceptable amount of phase shift in the conical oscillator loop. As indicated by FIG. 7, a notch filter 317 may also be provided, inserted between the filter 303 and the demodulators 49 and 45.

Figure 9:
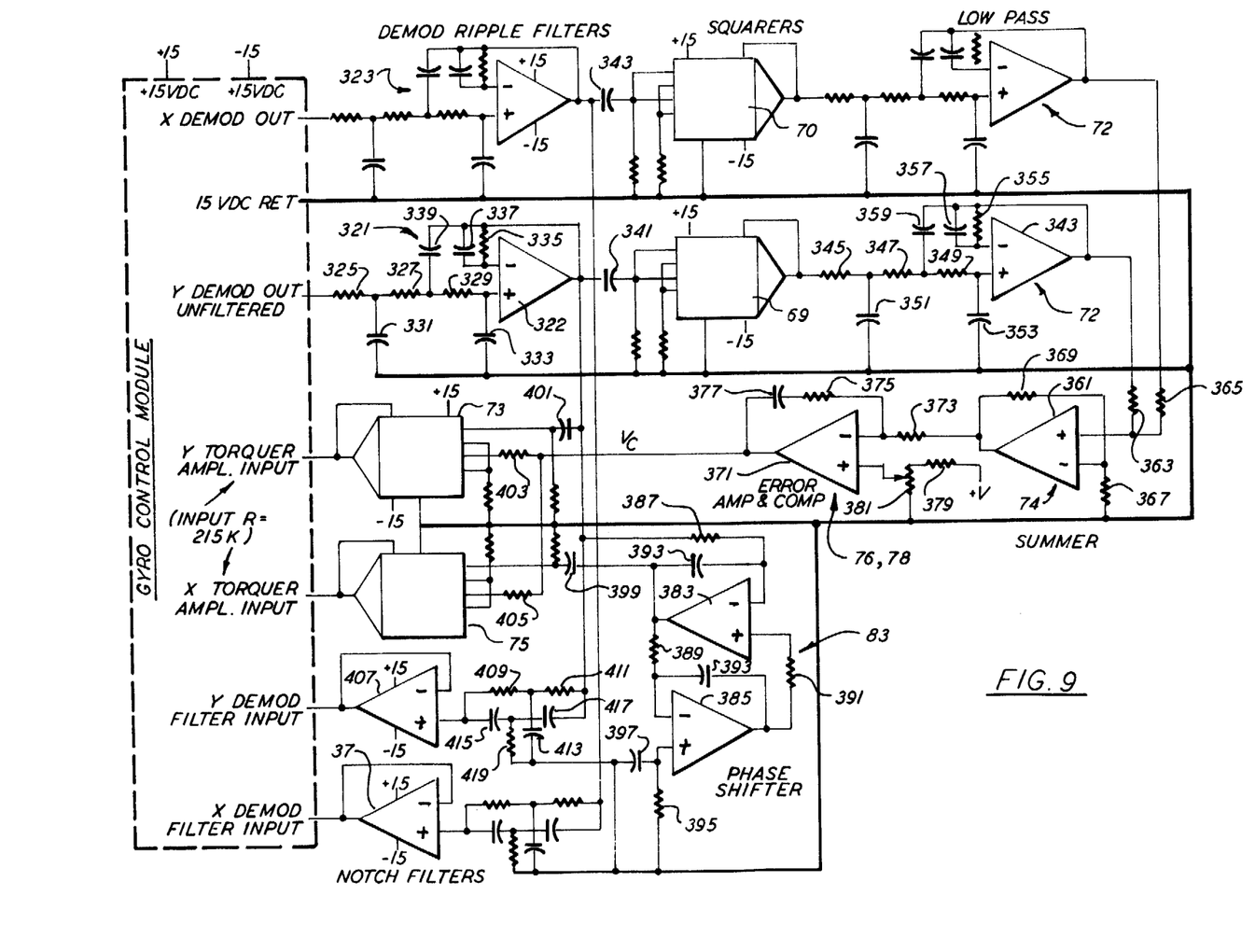
FIG. 9 is a detailed circuit diagram of the implementation of the present invention illustrated by FIG. 7.

FIG. 9 is a more detailed diagram of the nutation loop of the present invention. As illustrated thereon, prior to being coupled into the squarers 69 and 70, the demodulator outputs are coupled to ripple filters 321 and 323 respectively. Each of the filters includes an operational amplifier 322 with the demodulator coupled into its non-inverting input through resistors 325, 327 and 329 in series. The junction between resistors 329 and 327 is coupled through a capacitor 331 to ground. Negative feedback from the output of the amplifier 325 is provided through a resistor 335 with a capacitor 337 in parallel thereacross. A further capacitor 339 couples the output back to the junction between resistors 327 and 329. This filter is used to filter out the excitation frequency provided to the coils which is approximately in the range of 20 kilohertz. The remaining signal which will be at the nutation frequency with a d-c component therein is capacitively coupled into the multipliers 70 and 69 through capacitors 341 and 343 respectively. Because of the capactive coupling the d-c component will be blocked and only the a-c component at the nutation frequency will the coupled through. The output of the multipliers 69 and 70 is in each case coupled into a low pass filter 72. The low pass filter comprises an operational amplifier 343 with the multiplier output coupled thereto through three resistors 345, 347 and 349 in series. The structure of this filter is similar to the structure of filters 321 and 323. The junction between resistors 345 and 347 is coupled to ground to a capacitor 351. The non-inverting input of amplifier 343 is coupled to ground through capacitor 353 Negative feedback to the inverting input of the amplifier 343 is provided through resistor 355 with capacitor 357 in parallel thereacross. An additional capacitor 359 couples the output of the amplifier 343 to the junction between resistors 347 and 349.

The summer 74 is implemented utilizing an amplifier 361 with input resistors 363 and 365 coupling, respectively the outputs of low pass filter 72 to its non-inverting input. Its inverting input is coupled to ground through a resistor 367. The output is also coupled to this input through a feedback resistor 369. The error amplifier and compensator 76 and 78 are implemented in a single unit comprising amplifier 371 which has its inverting input coupled through a resistor 373 to the output of amplifier 361. A resistor 375 and capacitor 377 in series couple the output of amplifier 371 back to its inverting input. The voltage reference is established by a voltage divider which includes a fixed resistor 379 and a variable resistor 381 in series between a positive voltage source and ground. The output of the filter 321 is also coupled as an input to the phase shifter 83. The phase shifter includes two amplifiers 383 and 385. The output of the filter 321 is coupled into the inverting input of amplifier 383 through resistor 387. The output of amplifier 383 is coupled through a resistor 389 to the inverting input of amplifier 385. The output of this amplifier is fedback through a resistor 391 to the non-inverting input of amplifier 383. Each amplifier 383 and 385 has a feedback capacitor 393 between its input inverting input and its output. The non-inverting input of the amplifier 385 is coupled to ground by means of a resistor 395 with a capacitor 397 in parallel therewith. The output of amplifier 383 is the phase shifted output. This is fed through a capacitor 399 as one input to the multiplier 75. The output of filter 321 is fed into the multiplier 73 through a capacitor 401. The output of the error amplifier and compensator 76, 78 i.e., the output of amplifier 371 is fed through input resistors 403 and 405 to the multiplier 73 and 75 respectively. The outputs of these multipliers, as indicated above are fed as additional inputs to the torque amplifiers of FIGS. 2 and 8. The final element shown on FIG. 9 are the notch filters 37. These have as respective inputs the outputs of filters 321 and 323. It is the purpose of these filters to filter out the portion of the signal at the nutation frequency and provide at their outputs d-c levels representing the demodulator outputs. Each of the filters includes an amplifier 407 having its output tied directly back to its inverting input. The output from the filters 321 and 323 are coupled into the non-inverting input of the amplifiers 407 through two resistors 409 and 411 in series. The junction of these two resistors is coupled through a capacitor 413 to ground. Across the resistors 409 and 411 are series capacitors 415 and 417. The junction of these two capacitors is coupled through a resistor 419 to ground.

Although the means described herein to establish steady-state conical oscillation of the gyro spin axis about the blind axis at nutation frequency involved connecting the X axis pickoff to the Y axis torquer through a suitable network, and vice versa, no intention is made to exclude other means which satisfy the general requirements for steady-state sinusodal oscillations. Indeed connecting the X axis pickoff to the X axis torquer and the Y axis pickoff to the Y axis torquer, both through suitable networks, could accomplish the same result.

What is claimed is:

1. In a gyroscope including a rotor spinning about a spin axis, said rotor gimbaled about two mutually perpendicular axes so as to provide rate information along two axes, a method of also causing said gyro to provide rate information about its blind, spin axis comprising:
   (a) causing the gyroscope spin axis to nutate in a cone about its nominal, blind, spin axis at a controlled amplitude and at a frequency which is at least close to the natural nutation frequency of the gyro; and
   (b) detecting any variation in at least one of the coning parameters of amplitude and frequency to thereby obtain a measure of the rate about said blind axes.

2. The method according to claim 1 wherein said gyro includes cross-coupled closed loops operative on said two mutually perpendicular axes and wherein said step of causing coning comprises superimposing on those loops a frequency near the nutation frequency of the gyro and establishing additional feedback loops for controlling the amplitude of the superimposed frequency so as to obtain a symmetrical cone and wherein the parameters measured is the change in amplitude caused by the interaction of the blind axes with a momentum vector.

3. The method according to claim 1 wherein said gyro includes cross coupled loops operative on said two mutually perpendicular axes and wherein said step of causing coning comprises superimposing on those loops a frequency near the nutation frequency of the gyro and establishing additional feedback loops for controlling the amplitude of the superimposed frequency so as to obtain a symmetrical cone and wherein the parameter measured is the change in frequency caused by the interaction of the blind axis with a momentum vector.

4. In a gyroscope including a rotor spinning about a spin axis, said rotor gimballed about two mutually perpendicular X and Y axes, and cross coupled closed loops operative on said two mutually perpendicular axes so as to provide rate information about said two axes the improvement comprising:
   (a) means to cause the gyroscope spin axis to nutate in a cone about its nominal, blind spin axes at a controlled amplitude and at a frequency which is at least close to the natural nutation frequency of the gyro; and
   (b) means to detect any variation in the nutation about said spin axes to thereby obtain a measure of the rate about said spin axes.

5. Apparatus according to claim 4 wherein said means to cause include:
   (a) a first and second means to compare respectively the amplitude of nutation about the X and about Y axes with a predetermined reference value; and
   (b) means to provide an additional input to the each of the cross coupled closed loops responsive to the output of said first and second means to compare to maintain nutation at a constant amplitude and, wherein said means to detect comprise means to detect the output of at least one of said first and second means to compare.

6. Apparatus according to claim 4 wherein said means for causing comprise:
   (a) first and second means to detect the respective nutation amplitudes with respect to said X and Y axes and to provide outputs proportional thereto;
   (b) first and second means to square said outputs representing nutation amplitude with respect to the X and Y axes;
   (c) means to sum the outputs of said means to square;
   (d) means to difference the output of said summing means with a reference value;
   (e) a proportional and integral controller means obtaining an input from said means to difference and providing a control output;
   (f) first and second feedback loops to couple back to said cross coupled loops as an additional input thereto, the amplitude of nutation along one axis and to the other loop the nutation along that axis shifted by 90°, as first and second feedback signals;
   (g) first and second multiplying means interposed in said first and second feedback loops to multiply said first and second feedback signals by said control output, and;
   (h) wherein said means for detecting comprise means to detect the change in frequency of the output of at least one said sensing means.

7. Apparatus according to claim 4 wherein said cross coupled loops include at least a torquer coil for said x axis, a torquer coil for said y axis, a pick-off coil for said x axis, a pick-off coil for said y axis, an x pick-off demodulator, a y pick-off demodulator, an x torquer amplifier, and a y torquer amplifier, the output of the y demodulator being coupled through a loop back to the x torquer amplifier and the output of the x demodulator coupled through a loop back to the y torquer amplifier, and wherein said means for causing comprise:
   (a) first and second squarers obtaining as inputs respectively, the outputs of said x and y demodulators;
   (b) first and second lowpass filters having as inputs the outputs of said first and second squarers;
   (c) summer having as an input the outputs of said lowpass filters;
   (d) an error amplifier having as inputs the output of said summer and a reference voltage;
   (e) a compensator having the output of said error amplifier as an input;
   (f) a 90° phase shifter having as an input the output of one of the demodulators; and
   (g) first and second multipliers having, as first inputs, the output of said compensator and as second inputs, the output of said one of said demodulators and the output of said phase shifter respectively, the outputs of said first and second multipliers being provided as additional inputs to said x and y torquer amplifiers respectively.

8. Apparatus according to claim 7 and further including a notch filter coupling each of said x and y demodulators to the remainder of the capture loop for said x and y axes.

9. Apparatus according to claim 7 wherein said error amplifier and compensator comprise a single operational amplifier having as a non-inverting input said voltage reference, having as an inverting input the output of said summer and having a series capacitor and resistor in its feedback path to obtain integral proportional control.

10. Apparatus according to claim 9 and further including a demodulator ripple filter interposed between each of said x and y demodulators and said first and second squarers.

11. Apparatus according to claim 10 wherein said demodulator ripple filters and said lowpass filters are implemented with active filters including an operation amplifier.

* * * * *